United States Patent

Rennick

[15] 3,662,097

[45] May 9, 1972

[54] CHROMA PROCESSING CIRCUITRY WITH SELECTABLE COLOR CORRECTION MODE

[72] Inventor: John L. Rennick, Elmwood Park, Ill.

[73] Assignee: Zenith Radio Corporation, Chicago, Ill.

[22] Filed: May 18, 1970

[21] Appl. No.: 38,305

[52] U.S. Cl. .......... 178/5.4 HE

[51] Int. Cl. .......... H04n 9/12

[58] Field of Search .......... 178/5.4, 5.4 HE

[56] References Cited

UNITED STATES PATENTS

| | | | |
|---|---|---|---|
| 2,888,514 | 5/1959 | Pritchard | 178/5.4 HE |
| 3,525,802 | 8/1970 | Whiteneir, Jr. | 178/5.4 HE |

*Primary Examiner*—Richard Murray

*Attorney*—Donald B. Southard and John J. Pederson

[57] ABSTRACT

Chroma processing circuitry for a color television receiver wherein nominally derived primary color signals in accordance with extracted reference information in a first selectable mode of operation may be suitably modified in a second selectable mode of operation to minimize the effect of any phase errors otherwise readily discernible as undesirable departures in fleshtone hues. The referenced modification comprises a predetermined reduction in green-purple color information relative to derived luminance and orange-cyan information. Three embodiments are disclosed. In one such embodiment employing I and Q demodulation techniques, the chroma signal as applied to the input of the included Q demodulator is selectively reduced by associated control circuitry; the signal information along the Q axis or demodulation angle representing essentially green-purple color information. In another embodiment, employing convention (R–Y) and (B–Y) color difference demodulators, the desired reduction in green-purple information is provided by suitable alteration of the respective phase delays effected in components of the reference signal selectively applied to the demodulators which in turn alters each of the demodulation angles at which such demodulators operate. In still another embodiment, appropriate modification of the final primary color signals is accomplished by selected changes in the circuit parameters of an output matrix network associated with the color difference demodulators.

10 Claims, 7 Drawing Figures

Inventor
John L. Rennick
By [signature]
Attorney

Inventor
John L. Rennick
By [signature]
Attorney

Inventor
John L. Rennick
By [signature]
Attorney

CHROMA PROCESSING CIRCUITRY WITH SELECTABLE COLOR CORRECTION MODE

BACKGROUND OF THE INVENTION

This invention relates generally to improvements in color television receivers and in particular to improved chroma processing circuitry for such receivers wherein a viewer-actuated control is provided to minimize phase errors or variations in color signal information otherwise discernible in the reproduced image as undesirable departures in fleshtone hues.

The usual color television receiver utilizes a received composite signal having a main carrier which is amplitude modulated by brightness, or luminance, information as well as by horizontal and vertical sync pulses for providing signal scanning in proper time sequence. The received composite signal also includes chrominance information in the form of amplitude and phase modulation of a suppressed subcarrier. The reference for the demodulation of the chrominance information is provided by a few cycles of a color burst signal and is used to synchronize the output of a reference oscillator to insure accurate signal derivation for color reproduction. The generation, transmission and derivation of luminance, scanning and color information are in accordance with prescribed NTSC standards established for the television industry.

The color information in the suppressed subcarrier is contained in sidebands which collectively define hue and saturation at the image reproducer. In the more conventional system, signal voltages are derived which represent the red (R), green (G) or blue (B) color components of the picture which are then combined with the brightness or luminance information to form particular color difference signals. The latter are then utilized to form suitable control voltages for modulating the color subcarrier in quadrature, i.e., being 90° apart. The two modulating voltages, non-coincident in phase with any of the three color difference voltages, are known generally as "I" and "Q" signal components and are contained along specific reference axes, namely, 57° and 147°, respectively, with reference to the color burst signal.

Appropriate chroma processing circuitry is included in the receiver whereby the suppressed color subcarrier may be regenerated and selected phase components thereof heterodyned with extracted color sideband information in appropriate demodulator circuits and applied to an associated separate matrix network to derive the required three color difference signals. Such derived color difference signals are then utilized in combination with the extracted luminance information to provide appropriate primary color signals for selective application to the receiver picture tube, whereby the televised image is reproduced in color. The final matrixing of the demodulated color difference signals and luminance information may be matrixed within the picture tube itself or before application thereto in a separate video matrix network.

If the reference or color burst signal and the respective color difference signals are correctly developed and transmitted, and then subsequently detected and correctly demodulated in the receiver, the reproduced image may be expected to exhibit substantially faithful color fidelity. However, even though the color burst signal is included as a reference, errors can and do develop which affect color fidelity as a whole. These errors are usually in the form of differences in phase in various of the color information components which alters the time base on which demodulation must depend. Such errors in phase may be the result of differing standards employed as between respective television stations, by operational differences in cameras or other related station equiment, by the use of tapes or films, and still other factors. In any event, such errors readily manifest themselves as discernible variations in fleshtone hues.

Provision of course is included in the conventional receiver for changing hue, or "tint," according to the needs or preference of the viewer. However, it may nevertheless prove somewhat annoying or at least inconvenient for the viewer to make as frequent corrections as might be required to compensate for hue variations such as those attributable, for example, to the use of film or other mechanical recording media interspersed with live studio presentations.

SUMMARY OF THE INVENTION

Accordingly, it is an object of the present invention to provide improved chroma processing circuitry for a color television receiver which effectively overcomes the foregoing deficiencies.

A more particular object of the present invention is to provide an improved chroma processing circuit for a color television receiver wherein a viewer-operated control is included which when activated suitably compensates or minimizes the effect of phase errors occurring in the color information as translated by the receiver that may otherwise be discernible as undesirable departures in correct or selected fleshtone hues.

Another object of the present invention is to provide improved chroma processing circuitry of the foregoing type for a color receiver wherein selectable modes of operation are provided in which nominal derivation of primary color signals is effected in a first selectable mode, the relative magnitudes and vector locations being determined by the color reference information substantially as extracted from the received composite signal, and wherein alternatively such primary color signals may be suitably modified in a second selectable mode of operation to counteract or otherwise effectively minimize any color reference errors discernible to the viewer as changes in fleshtone hues.

In its broader aspects, the chroma processing circuitry of the present invention provides for conventional or nominal extraction of luminance and color reference information encoded in the received composite television signal. The disclosed system contemplates deriving appropriate color signals in prescribed form as applied to the receiver's picture tube for the reproducing of images in color. A viewer-actuated control is included which in a first selectable position provides for nominal derivation of luminance and primary color signals of given magnitude and vector position as determined by the color information encoded in the subcarrier sidebands, and which in a second selectable position effectively reduces color information along one reference axis by a predetermined amount relative to particular color information along a second reference axis and the extracted luminance information. The latter reference axis represents essentially orange-cyan color information and the former along which signal information is reduced represents essentially green-purple color information.

In one embodiment of the invention, I and Q demodulators are incorporated as component parts of the receiver color processing circuitry. The viewer-operated control is in the form of a variable resistance which in one position has a value effective to selectively reduce the level of chroma signal as applied to the input of the Q demodulator which, in turn, results in the desired reduction of color information along the green-purple axis in the derived primary color signals as applied to the picture tube. In another embodiment, conventional (R–Y) and (B–Y) color demodulators are employed and the desired reduction in color information along the green-purple axis is effected relative to the color information along the orange-cyan axis by a suitable change in the phase or injection angle of the color reference signal as applied to each of the color difference demodulators.

In still another embodiment respective color difference signals are derived by the color demodulator system in the conventional manner and are applied to an output video matrixing complex deriving primary color control signals. A viewer-operable control is effective in one mode to selectively alter the gain and transfer constants of such matrixing network so as to obtain the desired reduction of color information along the reference green-purple axis.

The features of the present invention which are believed to be novel are set forth with particularity in the appended claims. The invention, together with further objects and advantages thereof, may be best understood by reference to the following description taken in conjunction with the accompanying drawings, in which:

DESCRIPTION OF THE PREFERRED EMBODIMENTS

Figures 1, 2:
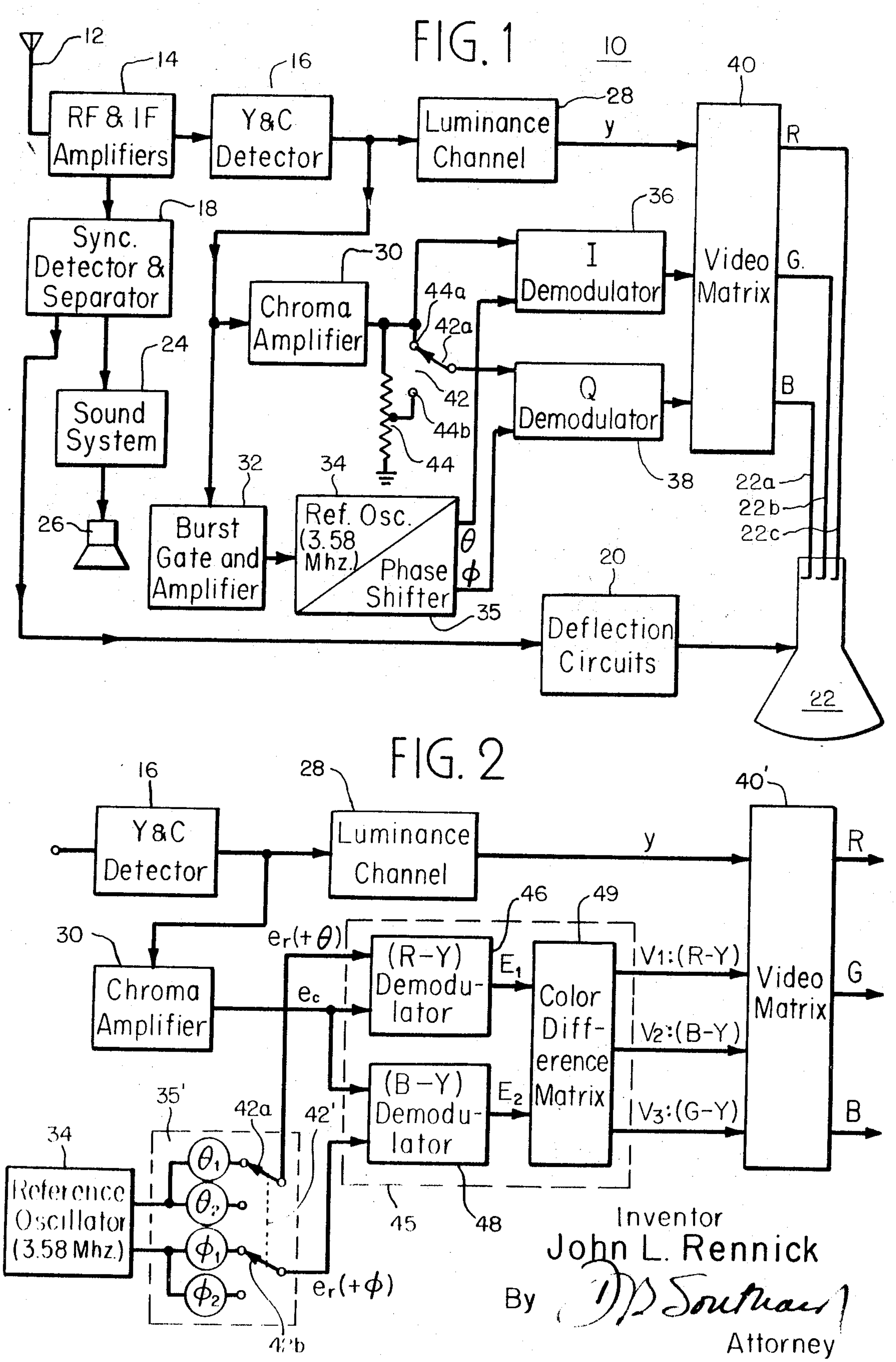
FIG. 1 is a combined schematic and block diagram of a color television receiver illustrating one embodiment of the present invention.
FIG. 2 is a partial schematic and block diagram of a color television receiver illustrating another embodiment of the present invention.

Referring now to the drawings, the color television receiver 10 of FIG. 1 includes an antenna 12 coupled to a first stage 14 having RF and IF stages for amplifying and converting a received composite signal to an intermediate frequency. The amplified IF signal is coupled to a luminance (Y) and chrominance (C) detector 16 and also to sync detector and separator circuitry 18. The latter detects the encoded horizontal and vertical sync and blanking information which when applied to the deflection circuits included in stage 20 generates appropriate horizontal and vertical scanning signals for application to the cathode-ray picture tube 22 for reproducing the televised image on the screen in a well-known manner. The output of the sync stage 18 is further coupled to the receiver sound system 24 which detects the audio portion of the received signal and applies the same to an associated loudspeaker 26.

The output of the Y and C detector 16 is applied to a luminance channel 28 and also to a chrominance amplifier 30, as well as to a burst gate and amplifier stage 32. Burst gate and amplifier 32 is effective to separate out the burst of subcarrier reference frequency included on the "back porch" of the horizontal blanking pulse. This detected and amplified signal occurring on a periodic basis serves as a control signal to synchronize operation of a reference oscillator 34. The reference oscillator 34 when synchronized at the correct reference frequency is effective to generate the 3.58 Mhz suppressed subcarrier necessary for demodulation of the chroma information. The composite chroma signal containing such information is present at the output of the chroma amplifier 30 which, as indicated, is coupled to each of the demodulator stages 36 and 38. An appropriate signal from reference oscillator 34 representing the regenerated subcarrier is also applied to demodulator stages 36 and 38, respectively, through a phase shifting network 35. Accordingly, the reference signal as applied to demodulator 36 is at a particularized phase $\theta$ and the reference signal as applied to demodulator 38 is at a phase $\phi$.

Figure 4:
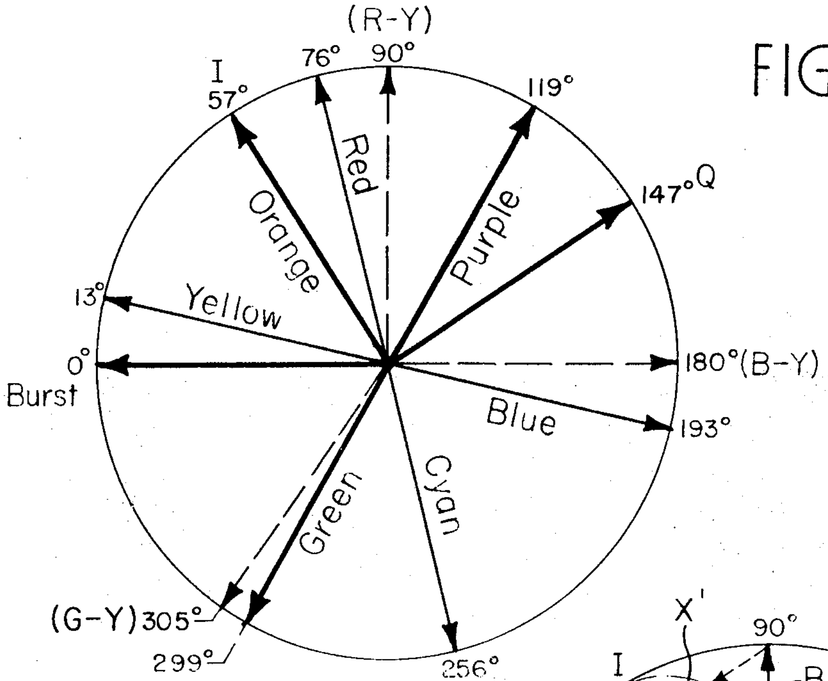
FIG. 4 is a representation of the conventional "color wheel" illustrating respective phase relationships or vector positions for the various color and reference signals which is useful in understanding certain of the operational characteristics of the present invention.

Demodulators 36 and 38 are termed I and Q demodulators as terms of art denoting that the demodulation of the chroma information takes place along I and Q reference axes as illustrated in the graphic representation of FIG. 4. The I and Q axes, as previously noted, customarily represent the reference angles at which color information is encoded at the transmitting station. The encoded color information along the I axis leads in phase the reference color burst signal by approximately 57° while the color information encoded along the Q axis is at approximately 147° with respect to the reference burst signal and thus is in quadrature with the I axis. As will be understood by those skilled in the art, respective angles of demodulation for the I and Q demodulators 36 and 38 are effectively determined by the phase of the signal from reference oscillator 34 as applied to each of their respective inputs, represented by phase angles $\theta$ and $\phi$, respectively. Synchronous demodulators 36 and 38 product an output signal which is a function of the applied chroma signal from stage 30 and the 3.58 Mhz reference signal from stage 34 at an appropriate phase, i.e., the output of each demodulator is proportional to that combination of the input chroma signal that is in phase with a particular applied reference signal and independent of that portion of chroma input signal that is in quadrature with the particular applied reference signal.

As will likewise be readily understood by those skilled in the art, the output color information signal may be coupled to a video matrix complex which in combination with an applied luminance signal is effective to derive particularized primary color signals, such as red (R), blue (B) and green (G), for application to appropriate control electrodes of the receiver picture tube 22, here represented as 22*a*, 22*b* and 22*c*. This method is commonly known in the art as pre-picture matrixing in a R–G–B system. It is to be understood, however, that the present invention is in no way limited to such pre-picture matrixing of the primary color signals. Color processing systems wherein color difference signals are developed and subsequently matrixed with derived luminance information within the receiver picture tube itself are likewise suitable. There are, however, several advantages to the pre-picture matrixing in the R–G–B type system. For example, semiconductor circuitry is more readily adaptable for use therein, power consumption is less, associated component parts are less costly, and related other factors. Illustration of just the R–G–B type system, however, should be entirely adequate for purposes of the present disclosure. Nor, it should be added, is the present invention to be limited to any particular set of primary colors that may be employed. Other arbitrarily chosen color primaries can be selected as set forth in the color wheel depicted in FIG. 4, if preferred, so long as no combination of a selected two can match the third primary.

As so far described, the component parts and functional aspects of the color television receiver 10 as set forth in FIG. 1 are entirely conventional. As described, correctly transmitted signals will be correctly demodulated in the receiver 10 and applied to its picture tube 22 to reproduce an image in color with expected standards of color fidelity. However, as previously pointed out, phase errors can and do frequently occur in the transmission and subsequent processing of the chroma information within the color receiver. Such errors are in the form of phase errors or variations between one color and another or the reference signal, and can produce significant departures in the fleshtone hues ranging from one of a purplish cast, through normal, to one with a somewhat greenish cast.

Reference to FIG. 4 readily illustrates the point. The fleshtone hue is represented substantially along the I or orange axis at approximately 57°. Any variation in phase will shift it toward the red or green sectors, depending on the direction of the particular phase variation.

The present invention provides a very simple but highly effective method of minimizing any such phase variations that otherwise may be readily discernible as unacceptable departures from correct or selected fleshtone hues. It is based on the rather surprising discovery that effective compensation can be obtained by selectively reducing the color information along a particular reference axis by a predetermined amount relative to color information along a second reference axis in quadrature with the first. The resultant response configuration includes effective shifts in phase for derived color signals at locations between the two reference axes in addition to the previously mentioned reduction in amplitude of the reference color information. The resultant phase change and amplitude reduction operate in conjunction with each other in additive effect to minimize any significant departures in fleshtone hues.

Figures 5, 6:
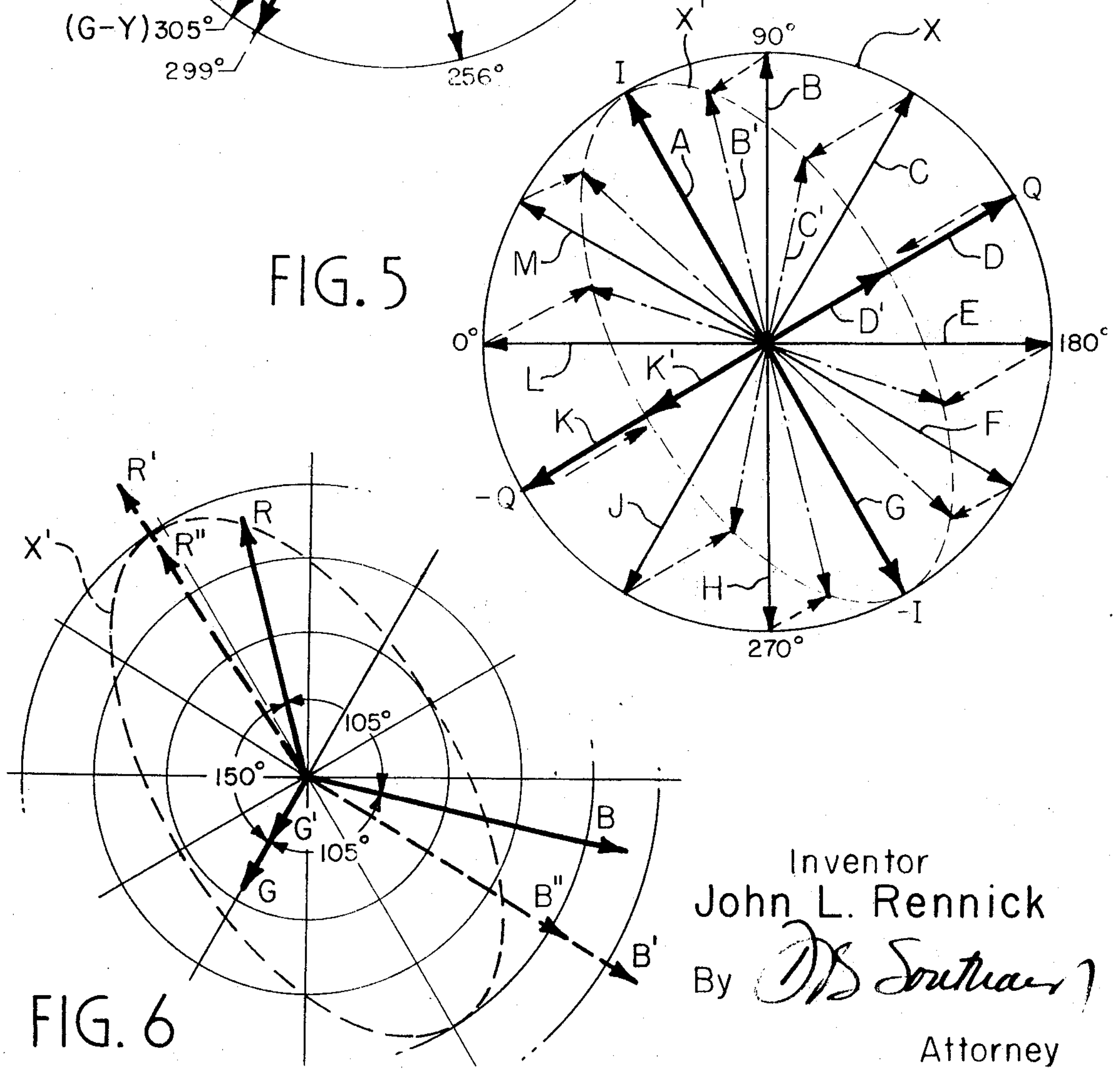
FIG. 5 is a graphic illustration of resultant changes in phase and amplitude of a somewhat idealized nature which are effected in various of the derived color signals when practicing the present invention.
FIG. 6 is a further graphic representation of phase and amplitude changes in derived color signals obtained in still another embodiment of the present invention.

The foregoing may be more readily appreciated by reference to FIG. 5. FIG. 5 represents a somewhat idealized situation but as much is considered more suitable to effectively illustrate the point. As shown, the heavy solid lines indicate the reference I and Q axes. The complementary colors to those included along the I and Q axes may be represented as –I and –Q, as indicated. Accordingly, if color information encoded along the referenced I and Q axes is subsequently decoded in a suitable demodulation process in the receiver, appropriate color signals may be obtained which for convenience are shown as located at some 12 locations around the color wheel at 30° intervals. Such color signals are indicated as having substantially equal magnitude, thereby forming a substantially circular response configuration identified at X. The various derived colors are represented by the somewhat thinner solid lines referenced at A through M, inclusive.

In operation, a nominal fleshtone hue may be expected to be located substantially along the I axis (reference color A). Should a system error cause such color signal to appear at some other location, say for example along a line at B or M, the intended fleshtone hue will take on a reddish to greenish cast. However, if in the foregoing described condition, the color information is reduced a predetermined amount essentially along the Q axis while maintaining the color information along the I axis substantially the same, the previously defined circular response configuration X is altered to that of a somewhat elliptical configuration, as represented by the dotted line outline X'. In particular, if the color information along the Q and –Q axis is reduced from the former magnitude, shown by the full length vector lines D and K, to the values indicated by the shorter vector lines D' and K', several consequences ensue. The Q component in each of the various derived colors will be reduced by a predetermined amount, as represented by the series of dotted lines in parallel with the Q axis and extending inwardly from the tip of each of the color vectors B through F, and H through M. This reduction in the Q component further results in an effective phase shift for the derived color signals, except those lying along the I, –I and Q, –Q axes. It is to be noted that the phase shift in each of the I and –I hemispheres is toward the particular reference I axis, i.e., colors B, C, L and M are shifted toward color A lying along the I axis and colors E, F, H and J are shifted toward color G lying along the –I axis. The result, then, is a change in both phase and signal amplitude for the colors B, C, E, F, H, J, L and M while only a change in magnitude occurs for the color information lying along the Q, –Q axis. The color information lying along the I, –I axis remains substantially unchanged in either response configuration. To this extent, the induced color compensation or correction is effected on a substantially linear basis, i.e., the same occurs in the spectral region in which the "warm" colors are located (yellows, reds, etc.) and also in the spectral region containing the "cold" colors (green, blue, etc.). The I, –I axis, it will be noted, includes essentially orange-cyan color information and the reduction in signal amplitude along the Q, –Q axis affects essentially green-purple color information.

The invention provides two modes of color signal processing for selective utilization in deriving primary color signals for application to the receiver picture tube. In one mode of operation, with full length color vectors forming the circular response configuration in FIG. 5, color information is demodulated and further processed, with the relative positions and magnitudes of the respective color signals A through M, inclusive, being determined by the extracted color information encoded in the received composite signal; this may be considered the normal or uncompensated mode of operation. Upon the occurrence of phase errors in the processing of extracted color information causing undesirable departures in fleshtone hues, a second mode of operation may be established in the receiver at the option of the viewer wherein such phase errors regardless of direction within given limits may be reduced or otherwise effectively minimized, i.e., shifted toward the reference axis representing fleshtone hue, as well as progressively reducing the magnitude of the respective color signal components in a direction away from such reference axis. The compensation or color correction as realized in the second operational mode is maintained on a substantially linear basis which further insures minimizing other color discrepancies that may otherwise be present in a nonlinear compensation system, such as for example, one effecting compensation in only the fleshtone sector as illustrated in FIG. 4 while maintaining or attempting to maintain substantially fixed vector relationships in various of the other sectors.

In accordance with the embodiment of the present invention shown in FIG. 1, the desired two-mode operation is provided by a viewer-actuated control in the form of a switching device 42, in combination with a tapped impedance 44 included in the output circuit of chroma amplifier 30. The chroma signal is impressed across impedance 44 and selectively applied to the inputs of I and Q demodulators 36 and 38. Switch device 42 is interposed in the signal path to the Q demodulator as indicated. When movable switch arm 42a is in contact with tap point *44a*, the same level of chroma signal is applied to both I and Q demodulators 36 and 38. With switch arm 42a in contact with tap 44*b*, a portion of the impedance 44 is inserted in series with the signal path to the Q demodulator 38, resulting in a reduction of the chroma signal as applied thereto. Upon suitable matrixing of the derived full strength I color difference signal and reduced Q color difference signal in the video matrix complex 40, primary color signals are developed which when applied to picture tube 22 include the desired reduction in color information along the green-purple reference axis relative to that along the orange-cyan reference axis. The result is the desired color compensation as previously described with reference to FIG. 5.

While the desired reduction in green-purple color information may be conveniently obtained by the foregoing method in a system employing I and Q demodulators, practical considerations in the usual commercial color receiver for the most part require demodulators operating at somewhat different reference axes. Accordingly, it is customary practice to demodulate the processed chroma signal at discrete 90° intervals with respect to the reference color burst signal, as shown in FIG. 4. The first 90° reference provides a color difference signal (R–Y) and the second 90° reference (180°) provides a (B–Y) color difference signal. The (R–Y) and (B–Y) signals are then utilized to derive the third, or (G–Y) color difference signal. The (R–Y), (B–Y) and (G–Y) color difference signals are then suitably matrixed in conjunction with the extracted luminance information to obtain final primary color signals utilized by the receiver picture tube 22 in reproducing the televised color image.

However, when using (R–Y) and (B–Y) demodulators, such as indicated at 46 and 48 in FIG. 2, reducing the chroma signal input to either of such demodulators will not effect the desired reduction in green-purple color information. This is because the (B–Y) and (R–Y) demodulators are operative at demodulation angles other than along the desired reference I and Q axes. Accordingly, in the embodiment of FIG. 2 the desired reduction is accomplished by a somewhat different method, i.e., by an appropriate alteration in the phase of the reference signal developed by reference oscillator 34 and selectively applied to (R–Y) and (B–Y) demodulators 46 and 48.

As indicated, the color demodulation system shown generally in dotted outline at 45, FIG. 2, includes an (R–Y) demodulator stage 46, a (B–Y) demodulator stage 48 and a mixer or intermediate matrix network 49. Demodulator output signals $E_1$ and $E_2$, representing extracted color information, are coupled to the matrix 49 to develop appropriate output color difference signals $V_1$, $V_2$ and an additionally derived color difference signal $V_3$. $V_1$ may be the (R–Y) color difference signal, $V_2$ the (B–Y) color difference signal, and $V_3$ the matrix-derived (G–Y) color difference signal. The operation of the color demodulation system such as identified at 45 is known in the art and is entirely conventional in operation such that further and more detailed description should not be necessary. Operational description of a demodulator system as represented at 45 is set forth, for example, in U.S. Pat. No. Re.24,747 to R. Adler et al, and assigned to the assignee of the present invention.

It is helpful, however, to consider certain of the more basic operational characteristics of color demodulator system 45 as a whole. In general, the chroma signal forming a part of the input signal to each of the demodulators 46 and 48 is in the form:

$$e_c = F(t) \sin wt \quad (1)$$

or, as expressed in terms of the NTSC subcarrier:

$$e_c = F(t) \sin wt + G(t) \cos wt, \quad (2)$$

where:

$F(t) = 0.49\,(E_B - E_Y)$ $G(t) = 0.88\,(E_R - E_Y)$

Accordingly, if the reference oscillator signal is in the form:

$$e_r = \sin(wt + \theta), \quad (3)$$

$\theta$ being a particularized phase delay, then, the demodulator output will be:

$$E_o = K[F(t) \cos\theta + G(t) \sin\theta], \quad (4)$$

$K$ being a gain factor constant.

When respective demodulator outputs are processed within a matrix network, the output control or color difference signals may be expressed generally as:

$$V_1 = H_{11} \cdot E_1 + H_{21} \cdot E_2 + H_{31} \cdot E_3 + \ldots$$
$$V_2 = H_{12} \cdot E_1 + H_{22} \cdot E_2 + H_{32} \cdot E_3 + \ldots$$
$$V_3 = H_{13} \cdot E_1 + H_{23} \cdot E_2 + H_{33} \cdot E_3 + \ldots \quad (5)$$

where:

$E_1 - E_3$ are the signals received from respective demodulators;

$H_{11} - H_{33}$ are particularized matrix transfer constants.

In the present system, as shown in FIG. 2, where only two demodulators are employed, the output signal voltages from the matrix 49 may be expressed as:

$$V_1 = K_1 \cdot H_{11}[F(t) \cos\theta + G(t) \sin\theta];$$
$$V_2 = K_2 \cdot H_{22}[F(t) \cos\phi + G(t) \sin\phi];$$
$$V_3 = K_1 \cdot H_{13}[F(t) \cos\theta + G(t) \sin\theta] + K_2 \cdot H_{23}[F(t) \cos\phi + G(t) \sin\phi]. \quad (6)$$

If, then, the various matrix parameters are chosen as, $K_1 = 2.03$; $K_2 = 1.14$; $H_{11} = H_{22} = 1$; $H_{13} = -0.186$; $H_{23} = -0.508$; $\theta = 0°$; and $\phi = 90°$ it will be appreciated that:

$V_1 = (E_B - E_Y)$, $V_2 = (E_R - E_Y)$ and $V_3 = (E_G - E_Y) = -0.186(E_B - E_Y) - 0.508(E_R - E_Y)$.

The conventional $(E_B - E_Y)$, $(E_R - E_Y)$, $(E_G - E_Y)$ color difference signals upon being further matrixed with the luminance signal, such as in the video matrix complex 40', provide final primary color control signals for selective application to appropriate control electrodes of the picture tube 22. The derived color signals are represented diagrammatically in FIG. 6 at R, G, and B. It may be noted that, in the conventional commercial color receiver, the respective magnitudes of the R, G and B color signals are not precisely equal, but are on the order as represented in FIG. 6 in terms of relative amplitudes and vector locations. The angular displacement between each of the R, G and B color signals may be substantially as indicated.

Should phase errors occur in color information being translated by the receiver, departures in fleshtone hues will result as previously described. However, in accordance with the embodiment of the present invention under consideration, such errors may be effectively minimized, not by reducing input chroma signal to a particular demodulator, but by selectively altering the demodulation angle along which the (R–Y) and (B–Y) demodulators 46 and 48 operate. This may be conveniently accomplished by modifying the particularized phase delays in the reference oscillator signal as selectively applied to the demodulators. Instead of phase delays $\theta_1$ and $\phi_1$ provided in the first selectable position of the inclined control device 42' in phase shifter network 35' (FIG. 2), phase delays $\theta_2$ and $\phi_2$ are effected by actuating control device 42' to its second selectable position.

Altering the phase delay of the reference signals from oscillator 34 as applied to the respective demodulators 46 and 48 also alters the demodulation angles at which they operate. From equations (6) it will be appreciated that, notwithstanding the fact that the transfer constants ($H_{11}$ — $H_{33}$) and gain factors ($K_1$, $K_2$) may remain the same, a change in phase represented by $\theta$ and $\phi$ results in an effective shift in the derived (B–Y) and (R–Y) color vectors ($V_1$ and $V_2$, respectively). Additionally, since the (G–Y) signal comprises a function of the former, an alteration likewise takes place in the latter. Accordingly, upon final matrixing in video matrix 40', derived primary color control voltages R, G and B are likewise altered. More specifically, if initial phase delay $\theta_1$ is reduced by some 15° to 20° (defining $\theta_2$) and initial phase delay $\phi_1$ is increased substantially an equal amount to form $\phi_2$, then the resultant R, G and B color signals will be shifted to entirely different reference locations, such as indicated at R'' and B'', respectively, FIG. 6. The magnitudes of the color signals R'' and B'' remain substantially the same as before but are effectively shifted in location. Since the G color signal is a function of R and B color signals, and since the phase changes in the latter are substantially equal but in opposite directions, the modified color signal G' will remain at approximately the same location as before with only its magnitude altered. The foregoing may as easily be shown by suitable recalculation of equations (5) and (6) using appropriate phase angles $\theta_2$ and $\phi_2$ as above defined in lieu of $\theta_1$ and $\phi_1$.

The result then, is a shift or alteration in the overall response as formed by the initial R, G and B color signals to one of a more elliptical configuration formed by the resultant R'', B'' and G'' color signals and represented by the dotted outline X'. Substantially the same conditions, it will be observed, are present here as described in connection with FIG. 5. That is, color information along the orange-cyan axis remains substantially the same, but a reduction by a predetermined amount occurs in the green-purple color information relative to the former and to the luminance information when switchable control device 42' is actuated to its second operational mode to provide the desired change in the respective phase delays for the reference signal as applied to demodulators 46 and 48.

Figures 2A, 3:
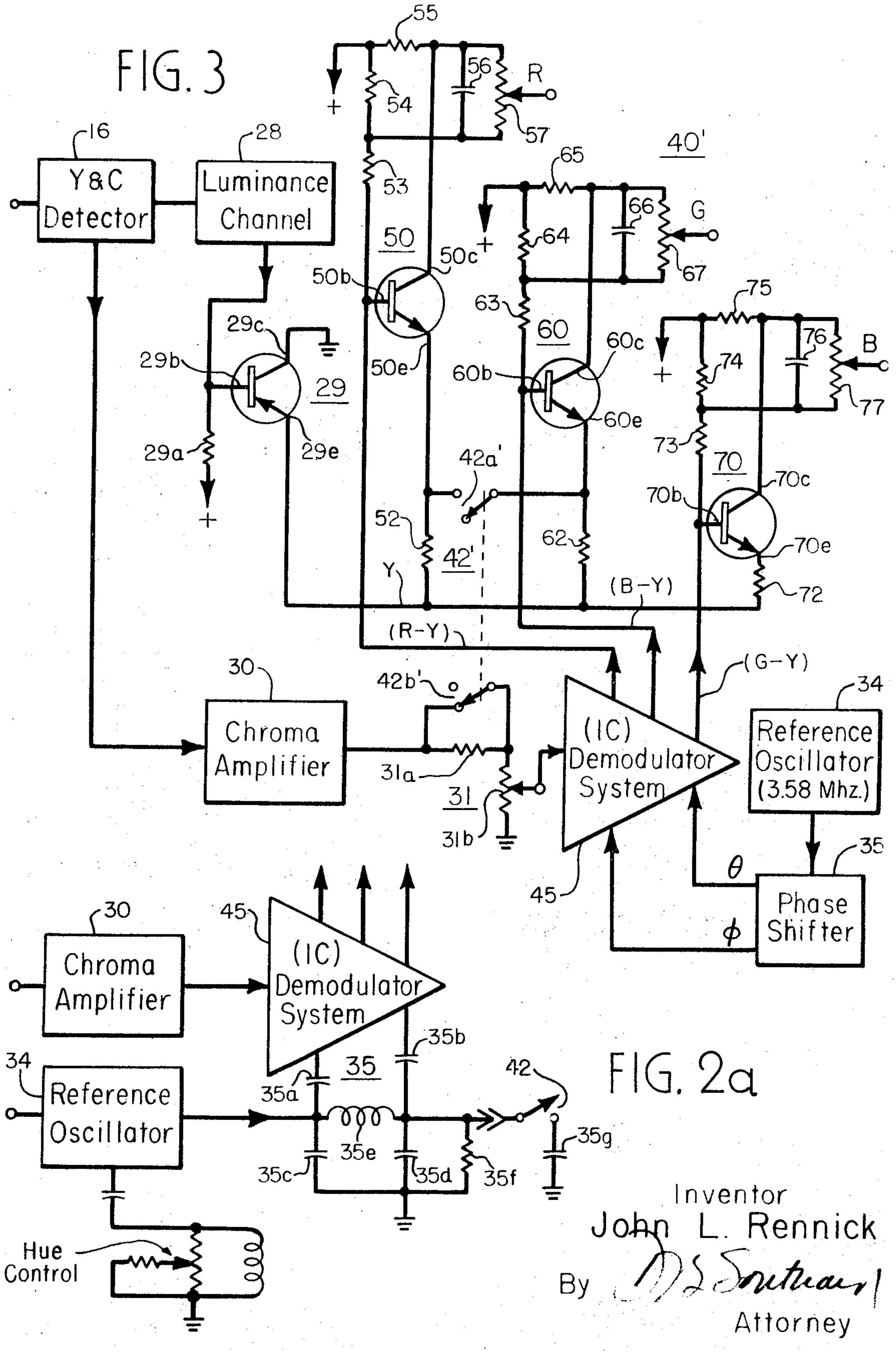
FIG. 2*a* illustrates in more detail the phase shifting network shown diagrammatically in FIG. 2.
FIG. 3 is a partial schematic and block diagram of a color television receiver illustrating still another embodiment of the present invention.

The selectively modified phase delays in respective components of the reference signal may be readily accomplished by the addition of but a single circuit element, as indicated in FIG. 2a. A typical phase shifting network 35 is illustrated which may include capacitive elements 35a, 35b, 35c and 35d, an inductive element 35e, and a resistive element 35f, all interconnected in the manner shown. As such, the appropriate reference signal from oscillator 34 is applied to the demodulator system 45 through the capacitor 35a at a given phase and also through the capacitor 35b but at a 90° phase differential with respect to that through capacitor 35a. Under these referenced conditions, R, G and B color signals are derived at the output of video matrix 40' and so illustrated in graphic form in FIG. 6. The desired alteration in the response configuration as shown at X', FIG. 6, may be accomplished by the inclusion of an additional capacitive element 35g selectively interconnected through a switch control device 42. Actuating device 42 to interconnect capacitive element 35g in phase shift network 35 results in the desired change in phase delay for the reference signals from oscillator 34 selectively applied to the appropriate demodulators in system 45 through capacitors 35a and 35b. In one arrangement found to give satisfactory operation, the following components were employed. It is to be understood, however, that such components are solely by way of illustration and not by way of limitation.

| | |
|---|---|
| demodulator system | integrated circuit module Type 701—(Sprague Electric) |
| capacitors 35*a*, 35*b* | 0.01 microfarads each |
| capacitors 35*c*, 35*d* | 820 picofarads each |
| inductance 35*e* | 3.02 microhenrys |
| resistance 35*f* | 68 ohms |
| capacitor 35*g* | 680 picofarads |
| control device 42 | standard SPDT switch |

Still another embodiment of the present invention is illustrated in FIG. 3. In this instance the respective phase delays in the reference signal as represented by $\phi$ and $\theta$ remain fixed at all times and the desired reduction in green-purple information is accomplished by selectively altering circuit parameters of the output video matrix network 40'.

As indicated, matrix network 40' includes a plurality of amplifier devices, such as transistors 50, 60 and 70. Derived color difference signals from the demodulator system 45 are applied to respective inputs thereof. For example, the derived (R–Y) signal may be coupled to transistor base **50*b*, the (B–Y) signal to transistor base 60*b*, and the (G–Y) signal to transistor base 70*b*. Operating power is provided to the respective transistor amplifiers by a voltage divider network connected between associated base and collector electrodes and a source of unidirectional potential. For transistor amplifier 50, the voltage divider network comprises resistances 53 and 54 serially connected between the source and base 50*b*, a resistance 55 connected between the source and collector 50*c*, and an r-c circuit formed by parallel-connected capacitance 56 and variable resistance 57 connected between the collector 50*c* and the junction of resistances 53 and 54, as shown. A similar network of resistances 63, 64, 65 and 67, and capacitance 66 is provided for transistor amplifier 60 while a network of resistances 73, 74, 75 and 77, and capacitance 76 is provided for transistor amplifier 70. Emitter loads are provided for transistor amplifiers 50, 60 and 70 by resistances 52, 62 and 72, respectively. The emitter load resistances are connected to a common terminal as shown, which terminal is likewise common to the output of an amplifier 29. Amplifier 29 serves as the output amplifier for the luminance signal developed in the luminance amplifier 28. Video matrix 40' operates generally in a known manner. A more particular operational description of the matrix network as identified at 40'**, however, is set forth in a copending application, Ser. No. 838,466, filed July 2, 1969 in behalf of Charles H. Heuer et al, and assigned to the assignee of the present invention.

In addition to the foregoing circuit elements, a double pole, double throw switch device 42' is included having a first switch portion **42*a*' interposed between the emitters 50*e* and 60*e* of transistor amplifier 50 and 60, and a second switch portion 42*b*' connected across resistance element 31*a* in series with adjustable resistance 31*b*, the action of which in conjunction with switch device 42'** will be described subsequently.

Accordingly, when switch device 42' is in the position shown in FIG. 3, color difference signals are selectively applied to the respective base inputs of transistor amplifiers 50, 60 and 70. The luminance signal Y developed in luminance channel 28 is applied to output amplifier 29 where it is suitably amplified and applied to the common terminal to which emitter load resistors 52, 62 and 72 are connected. Accordingly, appropriate matrixing action is effected in the well-known manner within each of the transistor matrix amplifier 50, 60 and 70 whereby primary color signals R, G and B appear across respective ones of the adjustable resistances 57, 67 and 77, which color signals are represented graphically in FIG. 6 at particularized reference locations and magnitudes. It will of course be appreciated that the various gain and matrix transfer constants as set forth in equations (5) and (6) must necessarily be of certain prescribed values.

To obtain the modified response configuration as represented by the dotted outline X' in FIG. 6, it has been found that the necessary shifts in vector location for the R and B color signals may be conveniently obtained by appropriate interconnection of the emitters **50*e* and 60*e* of transistor amplifiers 50 and 60 serving as the red and blue matrix amplifiers, respectively. Such interconnection may be provided through the action of switch portion 42*a*' when actuated to its closed or second positional mode. When emitters 50*e* and 60*e* are so interconnected, two consequences ensue. First, an effective shift in vector position takes place for the red and blue primary color signals, i.e., from nominal positions represented at R and B, FIG. 6, to the respective positions indicated at R' and B'. Such shift occurs by reason of the increased level of blue component signal injected in the emitter circuit of red matrix amplifier 50 and likewise an increase in the level of red component signal injected in the emitter circuit of blue matrix amplifier 60**. The precise characteristics of the modified color vectors are readily obtainable by appropriate recalculation of equations (5) and (6) set forth hereinbefore.

In addition to the shift in vector position, the gain of both the transistor amplifiers 50 and 60 is effectively increased due to the alteration in emitter load impedance for transistor amplifiers 50 and 60 resulting from the cross connection of resistances 52 and 62. Accordingly, the initial red and blue color signals as shown in FIG. 6 at R and B are not only shifted in location but are also increased in magnitude, as represented by the full length lines R' and B', respectively. It is to be noted that, at this point, the (G–Y) color difference signal and the final matrixed primary green signal G remain the same as before.

To maintain substantially constant saturation level, the increase in red and blue primary color signals R' and B' must be reduced to substantially the same magnitude as the initial color signals R and B. This is accomplished by the action of the second switch portion **42*b*' of control device 42'. When switch portion 42*a*' is actuated to interconnect emitters 50*e* and 60*e* as previously described, switch portion 42*b*' is concurrently actuated to insert the additional resistance 31*a* in series with the signal path coupling the chroma signal to the input of the demodulator system 45. The value of the added resistance 31*a* is such that the increased amplification of transistors 50 and 60 is offset by the reduction in the level of color difference signals at the output of demodulator system 45. Accordingly, color signals R' and B' are appropriately reduced in magnitude to the level indicated at R'' and B''. It is to be noted that the reduced signal level at the output of the demodulator system 45 also reduces the level of the (G–Y) color difference signal applied to the input of transistor amplifier 70**, and in turn reduces the magnitude of the derived primary green color signal from that as represented at G to one on the order indicated G'.

Component values and types for the various circuit elements comprising matrix complex 40' which have been utilized in a commercial receiver to give satisfactory operation are set forth in the aforementioned copending application Ser. No. 838,466. The additional resistance element **31*a* included in the present invention is on the order of 330 ohms, the adjustable resistance element 31*b* approximately 500 ohms, while switch device 42'** may be of any suitable DPDT type.

As before, the end result is that modified primary color signals are developed in which essentially orange-cyan color information remains substantially the same along a first reference axis but results in a reduced level of signal information along a second reference axis comprising essentially green-purple information. Effective changes in vector location and magnitude for various of the other colors or hues likewise ensue as previously described in connection with FIG. 5.

Thus, the present invention provides a simple but highly effective means of compensating or otherwise minimizing undesirable departures in fleshtone hues due to phase variations or errors occurring in processing of chroma information. Such compensation may be provided by selective control of the level of input chroma signal to the Q demodulator when utilizing I and Q demodulation techniques, or by selective alteration of demodulation injection angles when using the more conventionalized (R–Y) and (B–Y) type demodulators, or alternatively, by selective changes in the matrixing action of the video matrix complex which may be attractive if a self-contained, integrated circuit module is employed as the receiver's demodulation system. In any event, a simple, viewer-actuated control is provided in all instances and the desired compensation effected in the chroma processing is accomplished on a substantially linear basis with the various attendant advantages that pertain thereto. Further, as set forth herein, the added components required to practice the present invention with reference to the majority of commercial color receivers is at most a single circuit element and/or a simple switching device. It should be further noted that the present invention is adaptable for any type color receiver, vacuum-tube or solid state, and also regardless of whether final primary color signals are matrixed within or without the receiver picture tube.

While certain particularized embodiments of the present invention are set forth and described herein, it will, of course, be understood that other variations and modifications may be effected by those skilled in the art without substantially departing from the true scope and spirit of the invention. Accordingly, the appended claims are intended to cover all such modifications and alternative constructions that may fall within their true scope and spirit.

What is claimed is:

1. In a color television receiver including an image reproducer and signal processing circuitry for extracting luminance information from a main carrier and respective color reference signals from a subcarrier modulated with essentially orange-cyan color information along a first axis and essentially green-purple color information along a second axis in quadrature with said first axis, chroma processing apparatus for producing an image in color having selectable modes of operation, including in combination:

circuit means for deriving a plurality of primary color signals from said luminance and color information signals for utilization by the image reproducer, and control means having a selectable position defining a first mode of operation in which the relative magnitudes of said primary color signals are substantially as determined by said extracted luminance and color information signals, and a further and additional selectable position defining a second mode of operation in which said green-purple color information in said derived primary color signals is reduced to a predetermined but finite amount relative to the luminance and orange-cyan color information.

2. Improved chroma processing apparatus for a color television receiver in accordance with claim 1 wherein said circuit means includes respective I and Q demodulators and associated matrix network means coupled to said demodulators to utilize the outputs therefrom and wherein said control means includes additional circuit means to selectively alter the level of color information as applied to said I and Q demodulators when changing from one selectable mode of operation to the other of said modes.

3. Improved chroma processing apparatus for a color television receiver in accordance with claim 2 wherein said control means comprises switch means which when actuated to define said second mode of operation selectively reduces the level of color information as applied to said Q demodulator.

4. Improved chroma processing apparatus for a color television receiver in accordance with claim 1 wherein said circuit means includes respective (R–Y) and (B–Y) color difference demodulators and associated matrix network means coupled to said demodulators to utilize the outputs therefrom and wherein said control means includes means for operating said demodulators along given demodulation angles, respectively, in said first selectable mode of operation and along predetermined demodulation angles, respectively, in said second mode of operation differing from said given demodulation angles.

5. Improved chroma processing apparatus for a color television receiver in accordance with claim 4 wherein said means for selectively establishing said selectable demodulation angles comprises a phase shift network having a plurality of interconnected reactive circuit elements forming first and second signal paths therethrough of predetermined phase delays to define said first mode of operation, and a further and additional reactive circuit element which when actively coupled to said phase shift network provides a predetermined alteration in the phase delay through each of said first and second signal paths, and switch means for detachably interconnecting said additional reactive circuit element in said phase shift network in said second mode of operation.

6. Improved chroma processing apparatus for a color television receiver in accordance with claim 1 wherein said circuit means includes a demodulation system developing (R–Y), (B–Y) and (G–Y) color difference signals and an associated video matrix means having respective matrix amplifiers which collectively exhibit given gain and matrix transfer constants and which individually utilize said respective color difference signals in conjunction with the extracted luminance information to derive primary color signals, and wherein said control means in defining said second mode of operation is effective to selectively alter the gain and matrix transfer constants for each of said matrix amplifiers.

7. Improved chroma processing apparatus for a color television receiver in accordance with claim 6 wherein said plurality of matrix amplifiers includes first, second and third semiconductor devices each having input, output and common electrodes and wherein said control means includes switch means having a first switch portion which when actuated provides a signal path between the common electrodes of said semiconductor devices serving as red and blue matrix amplifiers and a second switch portion which when actuated reduces by a predetermined amount the level of each of said color difference signals as developed by said demodulator system.

8. Improved chroma processing apparatus for a color television receiver in accordance with claim 1 wherein said control means in said one selectable position defining said first mode of operation provides red, green and blue color signals of given relative magnitudes and having an angular displacement of approximately 105° between said red and blue primary color signals and between said blue and green primary signals, and an angular displacement of approximately 150° between said green and red primary color signals, and wherein said other selectable position defining said second mode of operation provides an angular displacement between said red and blue primary color signals on the order of 135° to 145°, and which further reduces the magnitude of said derived green primary color signal by a predetermined amount relative to the magnitudes of said red and blue primary color signals.

9. In a color television receiver with signal translating circuitry and an image reproducer for reproducing a televised image in color, chroma processing apparatus, comprising in combination:

means for extracting luminance information from a main carrier and for extracting respective color reference information from a subcarrier along first and second reference axes in phase quadrature;

fleshtone tint stabilizing means including selectable control means which upon actuation modifies the extracted color reference information along one of said reference axis by de-emphasizing the same relative to that along said other reference axis and said luminance information; and circuit means for utilizing said modified color reference information and said other unmodified color reference information and said luminance information substantially as extracted to form a plurality of particularized primary color signals for application to the image reproducer wherein color signal information at respective angular intervals between said reference axes is progressively diminished in magnitude in a direction toward said reference axis representing said modified color reference information and which is effectively shifted in phase in a direction toward said reference axis representing said unmodified color reference information.

10. Improved chroma processing apparatus for a color television receiver in accordance with claim 9 wherein said first and second reference axes represent nominal I and Q axes, respectively, and wherein said modified color reference information represents essentially green-purple information and said unmodified color reference information represents essentially orange-cyan information.

* * * * *